US011797924B2

(12) United States Patent
Bhatia et al.

(10) Patent No.: US 11,797,924 B2
(45) Date of Patent: Oct. 24, 2023

(54) INVENTORY AND LOAD OPTIMIZATION

(71) Applicant: Target Brands, Inc., Minneapolis, MN (US)

(72) Inventors: Aashimi Bhatia, Karnataka (IN); Siva Naga Chandra Sunil Kumar Chinta, Karnataka (IN); Akshay Kumar Katta, Seattle, WA (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/410,712

(22) Filed: Aug. 24, 2021

(65) Prior Publication Data
US 2023/0068628 A1 Mar. 2, 2023

(51) Int. Cl.
*G06Q 10/087* (2023.01)
*G06Q 30/0601* (2023.01)
*G06Q 10/0835* (2023.01)

(52) U.S. Cl.
CPC ....... *G06Q 10/087* (2013.01); *G06Q 10/0835* (2013.01); *G06Q 30/0635* (2013.01)

(58) Field of Classification Search
CPC ............ G06Q 10/087; G06Q 10/0835; G06Q 30/0635
See application file for complete search history.

(56) References Cited

U.S. PATENT DOCUMENTS

| | | | | |
|---|---|---|---|---|
| 6,885,902 B2 * | 4/2005 | Crampton | .............. | G06Q 10/06 700/32 |
| 7,058,587 B1 * | 6/2006 | Horne | ................... | G06Q 50/04 705/7.22 |
| 7,539,630 B2 * | 5/2009 | Crampton | .......... | G06Q 30/0601 705/26.1 |
| 7,607,577 B1 * | 10/2009 | Yu | ........................ | G06Q 10/087 235/383 |
| 7,653,457 B2 * | 1/2010 | Bloom | ..................... | G07C 9/23 700/226 |
| 7,725,366 B1 * | 5/2010 | Franco | ................... | G06Q 10/08 705/28 |
| 7,761,346 B2 * | 7/2010 | Cooper | ................ | G06Q 10/087 705/28 |
| 7,788,145 B2 * | 8/2010 | Wadawadigi | ...... | G06Q 30/0633 705/28 |
| 7,881,986 B1 * | 2/2011 | Pape | .................... | G06Q 10/087 705/28 |
| 7,904,350 B2 * | 3/2011 | Ayala | ................... | G06Q 10/087 705/28 |
| 7,991,634 B2 * | 8/2011 | Cartwright | ........... | G06Q 10/083 705/330 |
| 8,001,017 B1 * | 8/2011 | Franco | ............... | G06Q 30/0601 705/28 |
| 8,442,879 B2 * | 5/2013 | Dewey, Jr. | ............. | G06Q 50/30 705/28 |
| 8,447,664 B1 * | 5/2013 | Pape | .................... | G06Q 10/087 705/28 |

(Continued)

Primary Examiner — Michael Jared Walker
(74) Attorney, Agent, or Firm — Merchant & Gould P.C.

(57) ABSTRACT

Methods and systems for managing transportation vessels within an enterprise system are disclosed. In example aspects, based on current inventory levels and transportation vessel constraints, an optimized inventory order may be placed to ensure efficient ordering of an item from a vendor. In some instances, a forward ordering adjustment may be made to efficiently use transportation vessel capacity.

18 Claims, 13 Drawing Sheets

(56) References Cited

U.S. PATENT DOCUMENTS

| | | | |
|---|---|---|---|
| 8,447,665 B1* | 5/2013 | Schoenharl | G06Q 10/087 705/28 |
| 8,458,014 B2* | 6/2013 | Cheng | G06Q 10/06 705/13 |
| 8,478,619 B2* | 7/2013 | Benda | G06Q 10/04 705/7.11 |
| 8,620,707 B1* | 12/2013 | Belyi | G06Q 10/087 705/28 |
| 8,666,848 B1* | 3/2014 | Polsky | G06Q 10/08 705/28 |
| 8,700,443 B1* | 4/2014 | Murray | G06Q 10/087 705/7.31 |
| 8,744,884 B2 | 6/2014 | Benda et al. | |
| 8,930,133 B2* | 1/2015 | Wurman | G05D 3/00 700/214 |
| 9,087,314 B2* | 7/2015 | Hoffman | G05D 1/0274 |
| 9,487,356 B1* | 11/2016 | Aggarwal | G06Q 10/087 |
| 9,697,488 B1* | 7/2017 | Shaikh | G06Q 10/06313 |
| 9,792,577 B2* | 10/2017 | Mountz | G06Q 10/087 |
| 9,805,402 B1* | 10/2017 | Maurer | G06Q 10/087 |
| 9,818,002 B1* | 11/2017 | Yunes | G06G 1/14 |
| 9,818,082 B1* | 11/2017 | Sadighian | G06Q 10/087 |
| 10,013,663 B2* | 7/2018 | Furman | G06Q 10/0637 |
| 10,235,653 B1* | 3/2019 | Stubbs | G06Q 10/087 |
| 10,318,921 B1* | 6/2019 | Tilly | G06Q 20/203 |
| 10,373,117 B1* | 8/2019 | Sadighian | G06Q 10/0875 |
| 10,373,462 B2* | 8/2019 | Oppenheimer | G06K 19/041 |
| 10,438,217 B1* | 10/2019 | Zhang | G06Q 30/0202 |
| 10,482,401 B2* | 11/2019 | Wurman | G06Q 10/087 |
| 10,699,223 B1* | 6/2020 | Shah | G06Q 10/0631 |
| 10,754,916 B1* | 8/2020 | Rehn | G06Q 10/087 |
| 10,832,206 B2* | 11/2020 | Lafrance | G06F 16/29 |
| 10,922,646 B1* | 2/2021 | Humair | G06Q 10/087 |
| 11,037,081 B1* | 6/2021 | Adnan | G06Q 10/06315 |
| 11,238,482 B1* | 2/2022 | Gaynor | G06Q 30/0235 |
| 11,301,794 B2* | 4/2022 | Zhu | G06N 20/00 |
| 11,367,042 B2* | 6/2022 | Wu | G06Q 10/0837 |
| 2002/0143669 A1* | 10/2002 | Scheer | G06Q 20/203 705/28 |
| 2005/0154653 A1* | 7/2005 | Jongebloed | G06Q 10/06 705/28 |
| 2006/0085235 A1* | 4/2006 | Nguyen | G06Q 10/087 705/28 |
| 2009/0182588 A1* | 7/2009 | Ashby | G06Q 10/087 705/5 |
| 2010/0205044 A1* | 8/2010 | Scheer | G06Q 10/08 705/28 |
| 2019/0347606 A1* | 11/2019 | Malecha | G06Q 30/0223 |
| 2020/0210947 A1* | 7/2020 | Devarakonda | G06Q 10/08355 |
| 2021/0209534 A1* | 7/2021 | Kurian | G06Q 10/06315 |

* cited by examiner

INVENTORY AND LOAD OPTIMIZATION

TECHNICAL FIELD

The present disclosure is generally directed to proactively determining inventory needs and how to transport the inventory items across an enterprise system.

BACKGROUND

Retailers often have multiple nodes within an enterprise system. Each one of these nodes, such as a retail location, distribution center, and flow center needs to maintain appropriate inventory and transport the inventory between nodes as needed. Further, the enterprise system may need to order and transport inventory from a supplier and/or vendor.

Existing solutions include systems and methods that describe how to manage inventory needs and how to transport such inventory. These traditional systems run a replenishment system independently from a transportation system. Further, these systems do not dynamically determine inventory needs in conjunction with transportation options or proactively determine which items to order and how much in combination with following transportation constraints.

SUMMARY

In summary, the present disclosure relates to methods and systems for managing transportation vessels within an enterprise system. In example aspects, based on current inventory levels and transportation vessel constraints, an optimized inventory order may be placed to ensure efficient ordering of an item from a vendor. In some instances, a forward ordering adjustment may be made to efficiently use transportation vessel capacity.

In an example aspect, a method of managing inventory and transportation vessels within an enterprise system is disclosed. One method includes receiving, at a software tool implemented on an inventory and transportation management computing system, inputs related to current inventory levels for at least one inventory item selected from a plurality of inventory items, and an optimal inventory balance for the at least one inventory item for a location, the location selected from a plurality of retail locations, a receiving center, and a flow center. The method further includes receiving, at the software tool, inputs related to a capacity of at least one transportation vessel selected from a plurality of transportation vessels. The method also includes determining, individually for each transportation vessel, a capacity constraint, the capacity constraint comprising a minimum amount of the at least one inventory item and a maximum amount of the at least one inventory item that can be transported on the transportation vessel. The method further includes dynamically determining an inventory need for a predetermined initial future time period for each of the at least one inventory items, the inventory need being the difference between the current inventory level and the optimal inventory balance. The method additionally includes automatically generating an inventory request, the inventory request including an order amount for the at least one inventory items, wherein the order amount is based at least in part on the inventory need and being within the capacity constraint, and automatically communicating the inventory request, wherein the inventory request includes a purchase order including the amount of the at least one inventory item to order and a packing instruction for the transportation vessel.

In another example aspect, a system for managing inventory and transportation vessels within an enterprise system includes a computing system including a data store, a processor, and a memory communicatively coupled to the processor. The memory stores instructions executable by the processor to: receive inputs related to current inventory levels for at least one inventory item selected from a plurality of inventory items, and an optimal inventory balance for the at least one inventory item for a location, the location selected from a plurality of retail locations, a receiving center, and a flow center; receive inputs related to a capacity of at least one transportation vessel selected from a plurality of transportation vessels; determine, individually for each transportation vessel, a capacity constraint, the capacity constraint comprising a minimum amount of the at least one inventory item and a maximum amount of the at least one inventory item that can be transported on the transportation vessel; dynamically determine an inventory need for a predetermined initial future time period for each of the at least one inventory items, the inventory need being the difference between the current inventory level and the optimal inventory balance; automatically generate an inventory request, the inventory request including an order amount for the at least one inventory items, wherein the order amount is based at least in part on the inventory need and being within the capacity constraint; and automatically communicate the inventory request, wherein the inventory request includes a purchase order including the amount of the at least one inventory item to order and a packing instruction for the transportation vessel.

In a further aspect, a non-transitory computer-readable medium comprising computer-executable instructions, which when executed by a computing system cause the computing system to perform a method of managing inventory items in a supply chain. The method includes receiving inputs related to current inventory levels for at least one inventory item selected from a plurality of inventory items, and an optimal inventory balance for the at least one inventory item for a location, the location selected from a plurality of retail locations, a receiving center, and a flow center, and receiving inputs related to a capacity of at least one transportation vessel selected from a plurality of transportation vessels. The method also includes determining, individually for each transportation vessel, a capacity constraint, the capacity constraint comprising a minimum amount of the at least one inventory item and a maximum amount of the at least one inventory item that can be transported on the transportation vessel, and dynamically determining an inventory need for a predetermined initial future time period for each of the at least one inventory items, the inventory need being the difference between the current inventory level and the optimal inventory balance. The method also includes automatically generating an inventory request, the inventory request including an order amount for the at least one inventory items, wherein the order amount is based at least in part on the inventory need and being within the capacity constraint. When the inventory need is greater than the capacity constraint, the computing system is configured to ration the order amount for the at least one inventory item. When the inventory need is less than the capacity constraint, the computing system is configured to increase the order amount for the at least one inventory item, wherein the increased order amount is within the capacity constraint of the transportation vessel. The method further includes automatically communicating the inventory request, wherein the inventory request includes a purchase order including the amount of the at least one inventory item to order and a packing instruction for the transportation vessel.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
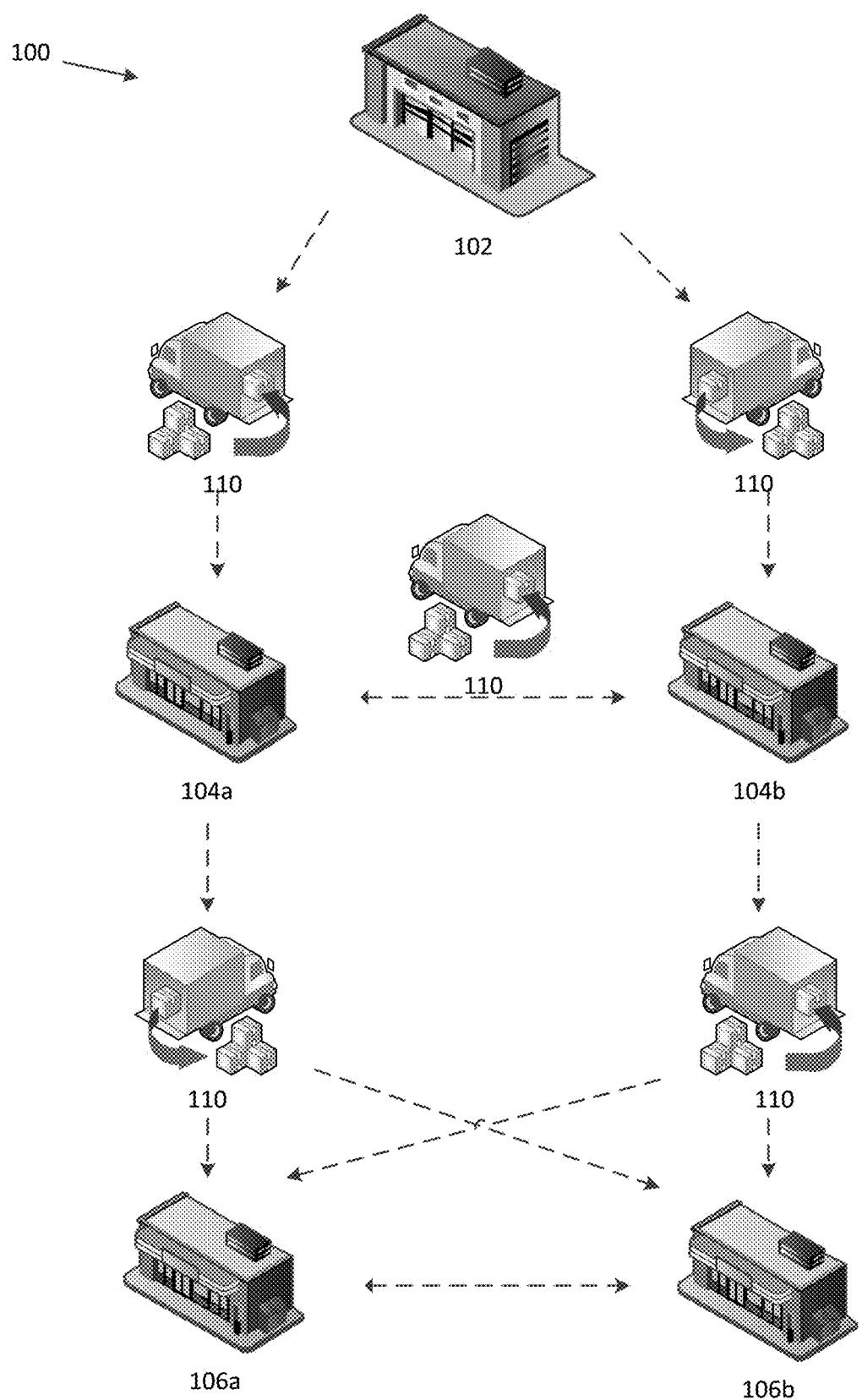
FIG. 1 illustrates a schematic diagram of an example supply chain for a retail enterprise.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

The inventory and load optimization system provides numerous advantages over traditional inventory ordering methods. For example, the inventory and load optimization system is proactive and allows for better planning, provides the breakdown of individual inventory items and specifies how much quantity of each item goes into each transportation vessel, and honors vessel constraints, such as how much an individual transportation vessel can carry.

Specific examples of the inventory and load optimization system include vector bin packing, which is a method of determining how to fill the bins to use the least number of bins that are loaded into the transportation vessels; truck rounding, which is identifying if a transportation vessel's load needs to be rationed or if the order needs to be canceled; and minimum/maximum capacity rules, which consider both volume and weight of each of the transportation vessels. The minimum bounds are "OR" constraints, while the maximum bounds are "AND" constraints.

Truck constraints (also referred to herein as transportation vessel restraints, when referring to vessels other than trucks) refer to constraints that determine the amount of inventory that can be transported by the transportation vessel. Transportation vessel constraints may be the available volume of a vessel, the weight the vessel can hold, or a combination of volume and weight. A minimum quantity refers to the minimum inventory required to refer to a transportation vessel as "full," and a maximum quantity is the limit of inventory items that the transportation vessel can hold. The truckload optimization rounding rules include determining needed inventory, assigning the inventory to transportation vessels, rounding the number of transportation vessels needed, meaning the minimum constraints and maximum constraints, and checking feasibility.

An enterprise system of the present disclosure utilizes an architecture of established retail sites, established flow centers associated with the retail sites, established receive centers for receiving product from vendors, and established hauling routes between receive centers, retail sites, and flow centers, herein referred to as "nodes." The inventory and load optimization system uses dynamic modeling to determine how much inventory should be purchased for a given item for each location on a per-day basis over a future predetermined time period. The inventory and load optimization system also determines the amount of inventory to load into each transportation vessel, and how those vessels are to be packed. Finally, the inventory and load optimization system can determine how many transportation vessels are needed.

The inventory and load optimization system is, in some embodiments, implemented on a data communication network that serves as a center for coordination of shipments between at least two enterprise nodes. In some embodiments, the system includes a collection of functions and features implemented in software and/or hardware that make the operation and management of ordering inventory, subject to minimum/maximum constraints for transportation vessels as an automated process.

In an enterprise system, inventory is constantly being ordered from vendors and/or suppliers. The inventory and load optimization system described herein provides a dynamic method of determining inventory needs, while taking into consideration the most efficient way of shipping those inventory items to the at least one node. For example, if an inventory item needs to be ordered on day one, but the inventory needs do not meet a minimum order requirement (or minimum transportation vessel constraint), the inventory and load optimization system determines the most efficient way to order those inventory items. A first consideration may be to skip the order on day one, and instead order on day two, wherein the day two order includes the previous days' needs (day one) and also day two's needs. The additional inventory from day one and day two can meet the minimum order requirement.

In another example, if the inventory required to be ordered on day one is less than the minimum order requirement, the inventory and load optimization system may look forward to the inventory needs for day two and add those inventory needs to the order on day one.

When the inventory required to be ordered on day one is greater than the capacity of a transportation vessel, the inventory and load optimization system dynamically determines how much inventory to remove from the order. Inventory may be removed from a single inventory item, or may be removed across a plurality of inventory items to be ordered.

The inventory and load optimization system described herein is useful for determining inventory orders when constraints regarding order amounts are necessary. For example, a constraint may be a minimum order quantity constraint. A minimum order quantity constraint from a vendor can be either in terms of weights, cartons, or individual items, also referred to as "eaches". When a minimum order quantity constraint exists, forward buying may be required in order to satisfy the constraint. An enterprise needs to determine which inventory item can be purchased in advance based on future expected demand, ideal position requirements, and holding costs.

FIG. 1 illustrates a schematic diagram 100 of an example supply chain for a retail enterprise. The diagram 100 illustrates the flow of inventory from the vendor 102 to the retail locations 106. The inventory moves through various nodes to arrive at the customer. In this example, the nodes include a vendor 102, two distribution centers 104a, 104b, and two retail stores 106a, 106b. In practice, the supply chain could include many more nodes, including flow centers, and in different proportions. In some embodiments, there are additional and separate receive centers and flow centers that house inventory between the vendor 102 and the retail store 106. Arrows in the diagram 100 indicate movement of inventory. Inventory will typically flow downward through the supply chain, but in some instances, inventory may move between the distribution centers 104a, 104b and the retail stores 106a, 106b.

Transportation vessels 110 move inventory between nodes. A first transportation vessel 110 may move inventory from the vendor 102 to the distribution center 104a. The same or a different transportation vessel 110 may move inventory from one retail store 106a to another retail store 106b. Still further, transportation vessels 110 may be used to move inventory items between other nodes, such as between the distribution centers 104a, 104b.

The vendor 102 produces and/or provides the items or products that will be sold by the retail entity. In some instances, the vendor 102 will transport the ordered products to a node within the retail enterprise. In other instances, the retail enterprise arranges for the inventory to be picked up from the vendor 102 and transported to the desired node. The inventory items may be transported in a variety of different transportation vessels 110. Example transportation vessels 110 include, but are not limited to, tractor-trailers, shipping containers, cargo ships, and aircraft cargo. Still further, different sizes and specialties (such as vessels including specialty equipment, such as refrigeration) for each of the transportation vessels 110 are considered. In example implementations of this application, semi-trailers are useable as the transportation vessel 110, but this is not to be seen as limiting.

In the context of the present disclosure, an inventory and load optimization management system is provided that assists in the proactive ordering of inventory items while maintaining minimum/maximum constraints. The minimum/maximum constraints may be relative to a transportation vessel 110, such as a volume or a weight that a single transportation vessel 110 can transport. Further, the minimum/maximum constraints may be relative to the vendor 102, such that a vendor 102 has a minimum order requirement before an order can be placed.

In some instances described herein, the minimum/maximum constraints are described relative to a single inventory item. However, it should be noted that the minimum/maximum constraints relative to a transportation vessel 110 may be applied to a plurality of inventory items that are ordered. Accordingly, as noted below, substantial advantages are realized using the methods and systems of the present disclosure.

It is in a general supply chain retail environment that the following systems and methods operate. While the systems and methods are described in a retail environment having brick-and-mortar stores as well as online sales, additional applications are possible. For example, the systems and methods could operate for distribution channels that distribute supplies to multiple locations within a business that does not have retail locations.

Figure 2:
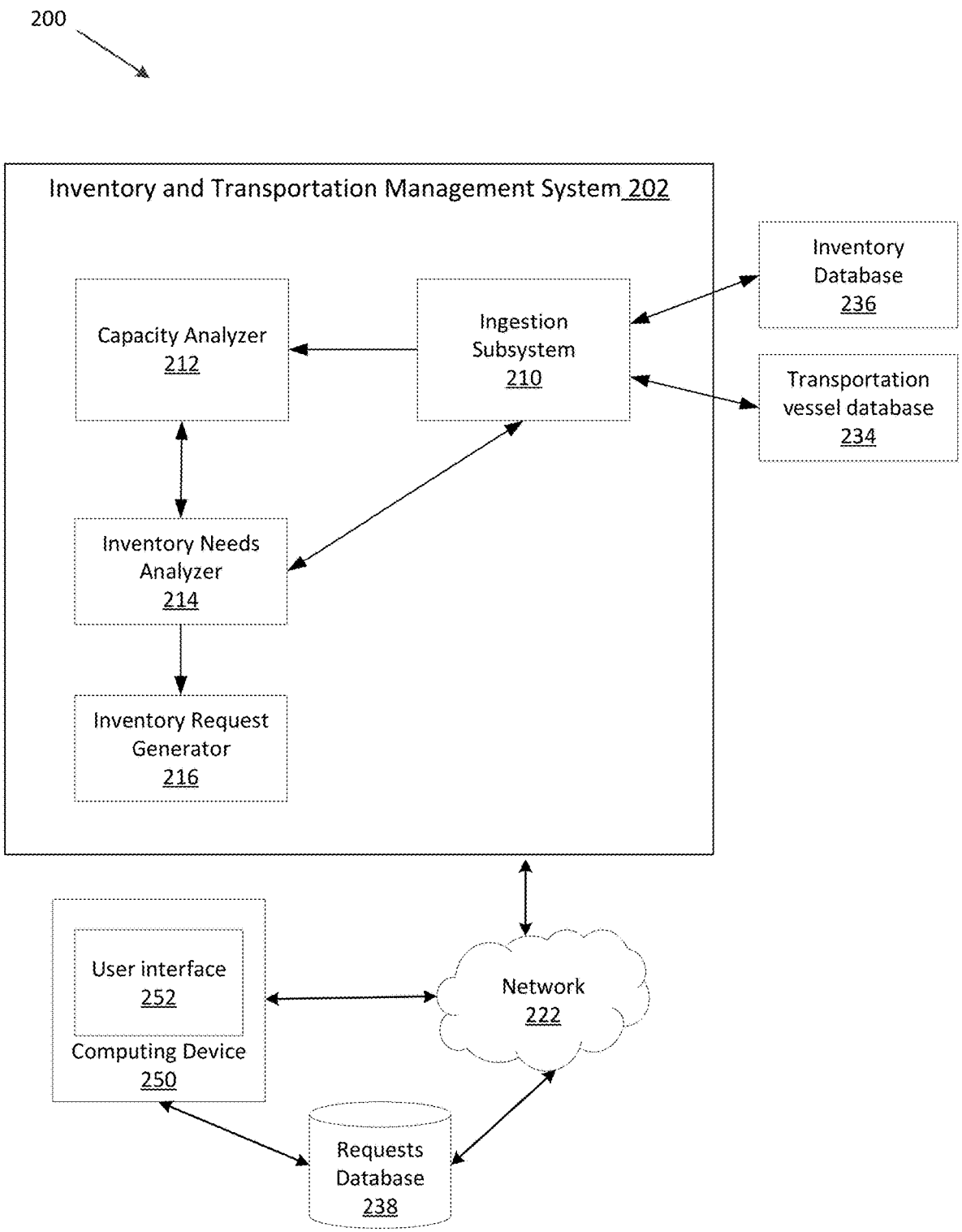
FIG. 2 illustrates a schematic diagram of an example system for implementing an inventory and transportation management system.

FIG. 2 illustrates a schematic diagram of an example system 200 for implementing an inventory and load optimization system 202. The inventory and load optimization system 202 can be implemented in the form of a software tool executable on a computing device, such as the device seen in FIG. 13. Components of the inventory and load optimization system 202 include an ingestion subsystem 210, a capacity analyzer 212, an inventory need analyzer 214, and an inventory request generator 216.

The ingestion subsystem 210 receives inputs from a plurality of databases, such as an inventory database 236 and a transportation vessel database 234. The inventory database 236 maintains inventory information across a plurality of inventory items across the enterprise system. The transportation vessel database 234 maintains information regarding a plurality of transportation vessels, including the capacity of the transportation vessels in volume and weight.

The inventory inputs are received by the inventory database 236, which is called via an inventory API after receiving a request from the ingestion subsystem 210. The transportation vessel inputs are received by the transportation vessel database 234, which is called by a transportation vessel API after receiving a request from the ingestion subsystem 210.

Inventory inputs are defined as the inventory levels of at least one inventory item for each node within the enterprise system. The inventory quantity may be described in a plurality of different ways. For example, inventory may be described in terms of eaches, cartons, or pallets. In another example, inventory may be described in terms of weight.

Transportation vessel inputs are defined as a type of vessel and the capacity of the vessel. Different types of vessels may include tractor-trailers, shipping containers, cargo ships, and aircraft cargo. The capacity of the transportation vessel may be described in terms of volume, weight, or a combination of volume and weight.

In response to receiving the inputs, the ingestion subsystem 210 provides the data to the capacity analyzer 212 and the inventory need analyzer 214. The capacity analyzer 212 in combination with the inventory need analyzer 214 determines the amount of inventory to be ordered based on the minimum/maximum constraints.

For example, the capacity analyzer 212 can determine the minimum and maximum constraints of the transportation vessel based on the type of transportation vessel. In another example, the capacity analyzer 212 can determine the minimum and maximum constraints based on a minimum order quantity requirement of the vendor.

The capacity analyzer 212 is also able to receive inputs regarding the at least one inventory item to be ordered to determine the minimum and maximum amount of inventory items that can fit in the bins and on the transportation vessel. The capacity analyzer 212 can also provide vector bin packing recommendations based on maximizing capacity.

The inventory need analyzer 214 can determine how much inventory is needed, based upon the current inventory levels for at least one inventory item for at least one node compared to an optimal inventory level for that inventory item for that node. The inventory need analyzer 214 can determine the inventory amount needed to be ordered to reach the optimal inventory level. The inventory need analyzer 214 can also re-analyze the inventory needs depending on the capacity received from the capacity analyzer 212.

When the inventory need analyzer 214 needs to re-analyze inventory needs, the ingestion subsystem 210 may need to utilize a second API to request second inputs from the inventory database 236 and/or the transportation vessel database 234.

The inventory need analyzer 214 can utilize historical inventory information to determine an optimal inventory balance for the at least one inventory item at each node. For example, the last six months of sales data may be used to determine an optimal inventory balance for the at least one inventory item. However, more or less time may be used to gather data points to determine the optimal inventory balance. Still further, special events, such as holidays, may be considered when an optimal inventory balance may be higher or lower than traditionally-determining inventory balances.

The inventory need analyzer 214 can also utilize a set of rounding rules, which specify when the inventory items ordered should be rounded up to fill a transportation vessel, or when the inventory items ordered should be rounded down so a transportation vessel is not needed. Determining which way to round inventory items ordered is determined by a set of load optimization rounding rules, such as provided by the capacity analyzer 212, and further described below.

After the capacity analyzer 212 and the inventory need analyzer 214 determine an amount of the at least one inventory item to be ordered based on the minimum/maximum constraints, the inventory request generator 216 generates an inventory request and sends it to the appropriate entity. The inventory request generator 216 can generate the request which includes the order amount for the at least one inventory item and a packing instruction for the transportation vessel.

The output provided by the inventory request generator 216 is sent to a user interface 252 of a connected computing device 250 via the network 222. The output provided by the inventory request generator 216 is also communicated with a requests database 238. The requests database 238 can be accessed via the network 222 by the inventory and load optimization system 202 and the computing device 250. The user interface 252 can be viewed by an administrative user of the inventory and load optimization system 202 for implementation.

In an example, the user interface 252 can provide a user with access to view and implement the ordering of inventory. The interface can also show the recommended number of transportation vessels needed and how each of the transportation vessels should be packed. In some examples, a user can view the recommended number of transportation vessels, the capacity of each transportation vessel, and how each transportation vessel is packed with inventory.

The inventory and load optimization system 202 communicates with a computing device 250 through a network 222. The network 222 can be any of a variety of types of public or private communications networks, such as the Internet. The computing device 250 can be any network-connected device including desktop computers, laptop computers, tablet computing devices, smartphones, and other devices capable of connecting to the Internet through wireless or wired connections.

Figure 3:
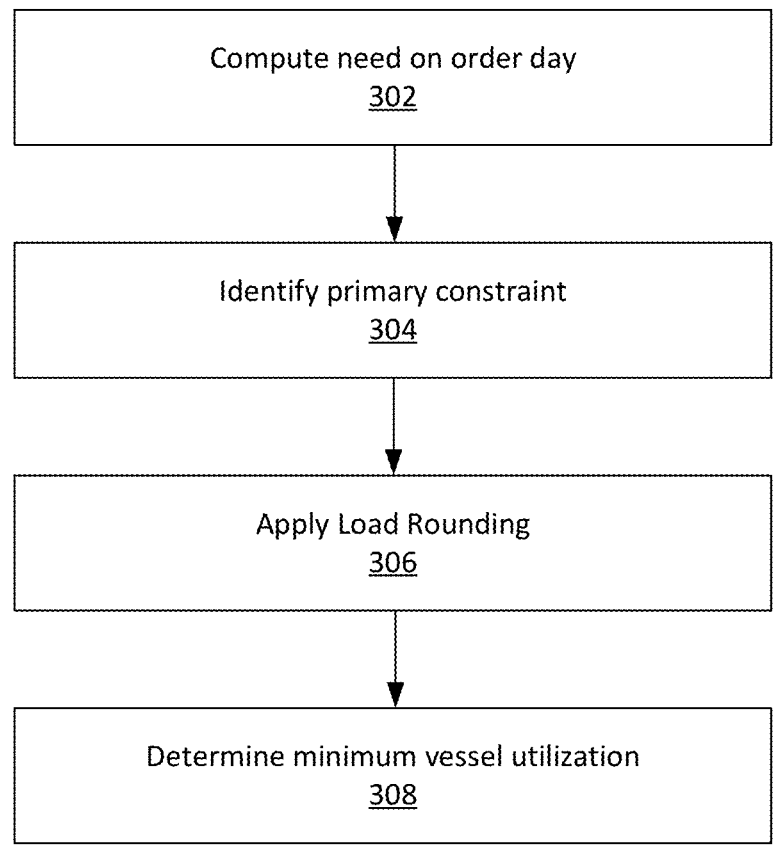
FIG. 3 illustrates an example method of determining inventory needs and maximizing transportation vehicle utilization.

FIG. 3 illustrates an example method 300 of determining inventory needs and maximizing transportation vessel utilization. At step 302, the need is computed for an order day. The need is computed individually for each inventory item, the inventory item selected from a plurality of inventory items stocked by the enterprise system. Although described in the examples herein, a single inventory item order is referred to, the method 300 may be used to order inventory for the plurality of inventory items.

The need is computed on a per-day basis. In the examples described herein, the initial day that inventory orders are to be placed is referred to as "Day 1." As described in more detailed examples below, an ordering day may be "Day 2," which is the day after day one. More generally, the initial day is "day i," and each subsequent day is "day i+1."

At step 304, the primary constraint is identified. The primary constraint may be the minimum/maximum constraints, which refer to the minimum amount required for a transportation vessel to transfer the amount or the maximum amount that can be packed within a transportation vessel. Still further, the primary constraint may be a minimum order quantity required by a vendor.

At step 306, rounding rules are applied. Rounding rules refer to the method of either rounding up or rounding down the ordered inventory to comply with the primary constraint. For example, if the inventory required to reach optimal inventory level is more than the maximum load limit of the transportation vessel, then the inventory ordered may be less than the inventory required. In an alternative example, if the inventory required to reach the optimal inventory level is less than the minimum load limit of the transportation vessel, additional inventory may be ordered. The additional inventory to be ordered may be inventory normally required to be ordered on "Day 2."

At step 308, the minimum vessel utilization is determined. This can include finalizing the inventory amount to be ordered for the at least one inventory item. This can also include determining the number of transportation vessels needed to transfer the inventory item(s). Further, this can also include determining how each transportation vessel is packed to achieve maximum utilization.

Figure 4:
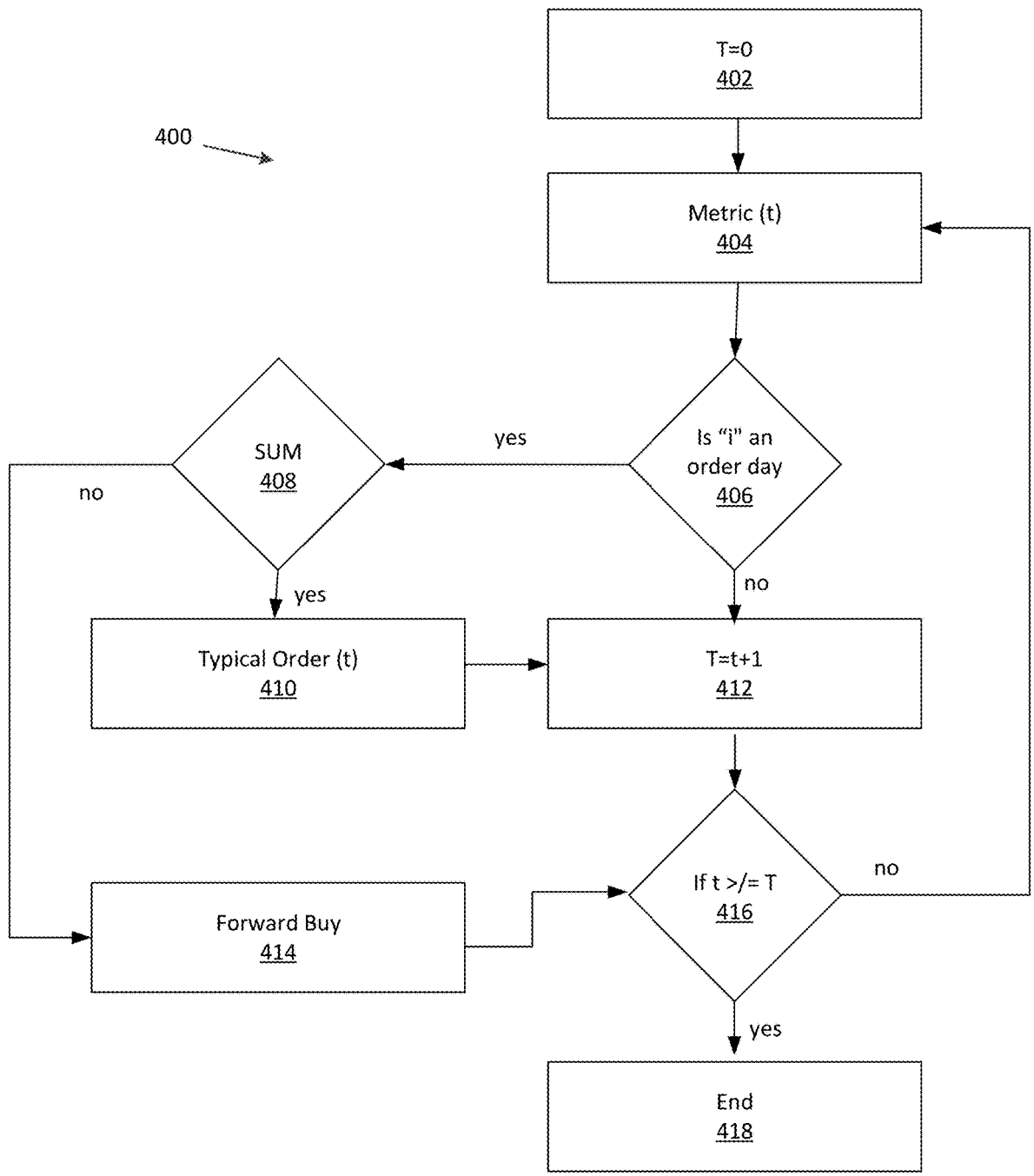
FIG. 4 illustrates a flowchart for determining how to forward purchase only when the net need by quantity is below the minimum order quantity.

FIG. 4 illustrates an example flowchart of utilizing a first heuristic to forward buy when the inventory need is below the minimum order quantity. The method 400 utilizes the following mathematical equations.

The following equation can be used to determine forward buying to satisfy the minimum order quantity. At period "i," an inventory quantity amount is ordered based on the need of all items. Equations 1-5 as follows are related to solving for the metric "t," which is the quantity needed at time "t."

Equations 6-8 are related to solving for a typical order "i," which is the number of items needed.

$$\overline{BoH_{i,t}} = \text{Initial\_Inv}_i \text{ if } t = 0 \text{ else } \overline{EoH_{i,t-1}} \forall i \quad \text{Equation (1)}$$

$$\overline{BoH\_aft\_divry}_{i,t} = BoH_{i,t} + \text{Receipts}_{i,t} \forall i \quad \text{Equation (2)}$$

$$EoH_{i,t} = \quad \text{Equation (3)}$$
$$\max(0, BoH\_aft\_divry_{i,t} - \text{Expected\_withdrawal}_{i,t}) \forall i$$

$$\text{On\_Order}_{i,t} = \quad \text{Equation (4)}$$
$$\text{sum}(\text{Receipts}_i) \text{ if } t = 0 \text{ else On\_Order}_{i,t-1} - \text{Receipts}_{i,t} \forall i$$

$$\text{Need\_by\_qty}_{i,t} = \quad \text{Equation (5)}$$
$$\left\lceil \frac{\max(0, HP_{i,t} - EoH_{i,t} - \text{On\_Order}_{i,t})}{\text{UoM\_qty}_i} \right\rceil^* * \text{UoM\_qty}_i \forall i$$

$$\text{order\_qty}_{i,t} = \text{Need\_by\_qty}_{i,t} \forall i \quad \text{Equation (6)}$$

$$\text{On\_Order}_{i,t} = \text{On\_Order}_{i,t} + \text{order\_qty}_{i,t} \forall i \quad \text{Equation (7)}$$

$$\text{Receipts}_{i,t+L} = \text{Receipts}_{i,t+L} + \text{order\_qty}_{i,t} \forall i \quad \text{Equation (8)}$$

In equations 1-8, "t" is the time period or length of time. As used herein, generally a time period is equal to a single day. "L" is the vendor lead time required. "UofM_qty" is the unit of measure quantity for each individual item. A unit of measure may be an individual item, a pallet, or any other quantity amount. "Initial_inv" is the opening physical on-hand inventory for the inventory item "i" at the start of the planning horizon. "$BoH_{it}$" is the projected beginning on-hand inventory for the inventory item at the start of each time period before any receipts. "$BoH_{i,o}$" is the opening on-hand inventory. "BoH_aft_dlvry$_{it}$" is the projected beginning on-hand inventory for the item at the start of each time period after accounting for each day's receipts. "$EoH_{it}$" is the projected ending on-hand inventory amount. "On_order_qty$_{it}$" is the on-order quantity at the end of each time for each inventory item. On-order quantities are initialized with scheduled receipts from previous planning horizon periods. "Receipts$_{i,t}$" is the quantity received at the start of each time period for each item, and the quantity received could be scheduled or planned. "Expected_withdrawal$_{i,t}$" is the expected withdrawal demand for each item "i" in the time period "t". "IIP$_{i,t}$" is the ideal inventory position to be maintained for each item in each time period. This variable is defined only for days on which an order can be placed. "Order_frequency$_t$" is the bullying indicator for an inventory item to be eligible for placing an order. "MOQ" is the minimum order quantity to be placed for the entire group when an order is placed. The minimum order quantity could be determined in eaches, cartons, or weight.

FIG. 4 illustrates a flowchart for determining how to forward purchase only when the net need-by-quantity is below the minimum order quantity. As described in the flowchart, the enterprise system iteratively adds one days' worth of supply for all the items until the minimum order quantity constraint is met.

The method 400 illustrated in FIG. 4, shows how the equations 1-8 are useful to determine inventory requests. Step 402 represents a time period before which inventory is ordered. This time period is referred to as t=0.

At step 402, the metric "t" is received. The algorithms of determining "t" are described above with reference to equations 1-5.

At step 404, it is determined whether or not the day in question, day "i" is an order day. If it is an order day, then the method moves to step 408. At step 408, the sum is determined, which is the quantity needed. Using the quantity needed, it is determined whether or not this quantity needed is greater than or equal to the minimum order quantity. If the quantity needed is greater than or equal to the minimum order quantity needed, then the method 400 moves to step 410. At step 410, the order is placed.

If the quantity needed is less than the minimum order quantity needed, then the method 400 moves to step 414. At step 414, forward buy for the inventory item is determined. As described below in more detail, forward buy is effectively ordering an inventory item for future needs, instead of just the inventory needs of day "i." Then, the method 400 moves to step 416.

At step 406, if it is not an order day, then the method 400 moves to step 412. At step 412, the algorithms proceed by determining inventory needed for the next day, which is "t=t+1."

At step 416, if "t" is greater than or equal to "T," then the method 400 moves to step 418, where an order is placed. If "t" is less than or equal to "T," then the method 400 reverts back to step 404.

Alternatively, determining how to reach a minimum order quantity constraint is determined by the equations 9-11 set out below. In this set of equations, inventory is added sequentially for one item at a time. After adding for each item, the minimum order quantity constraint is checked and the algorithm terminates when the constraint is satisfied.

This alternative method may incorporate running equations 1-5 and then removing the day of supply from a subset of items such that the resultant is closest to the minimum order quantity found. In other words, as many items as possible are removed subject to the condition that the removal satisfies that the constraint optimizes utility.

$$\text{Max} \sum p_i x_i \quad \text{Equation (9)}$$

$$\sum_{ST} w_i x_i \leq W \quad \text{Equation (10)}$$

$$\forall x_i \text{ binary} \quad \text{Equation (11)}$$

In equations 9-11, the following variable definitions are used. "$X_i$" is given a value of 1 if the item is selected for removal of supply, or a value of 0 otherwise. "$P_i$" is the utility associated with removal of one day of supply for the inventory item. This can be defined as "$h_i$" multiplied by "epoch_supply_qty$_i$." "$h_i$" is the holding costs per item per day for the inventory item and "epoch_supply_qty$_i$" is the one day supply added for each inventory item expressed in a quantity "$w_i$." "epoch_supply_qty$_i$" is expressed as per the minimum order quantity type. For example, if the minimum order quantity type is weight, then this variable will be expressed in weight for one day for the item. "W" as additional supply added over the minimum order quantity is expressed in minimum order quantity type denominations.

Figure 5:
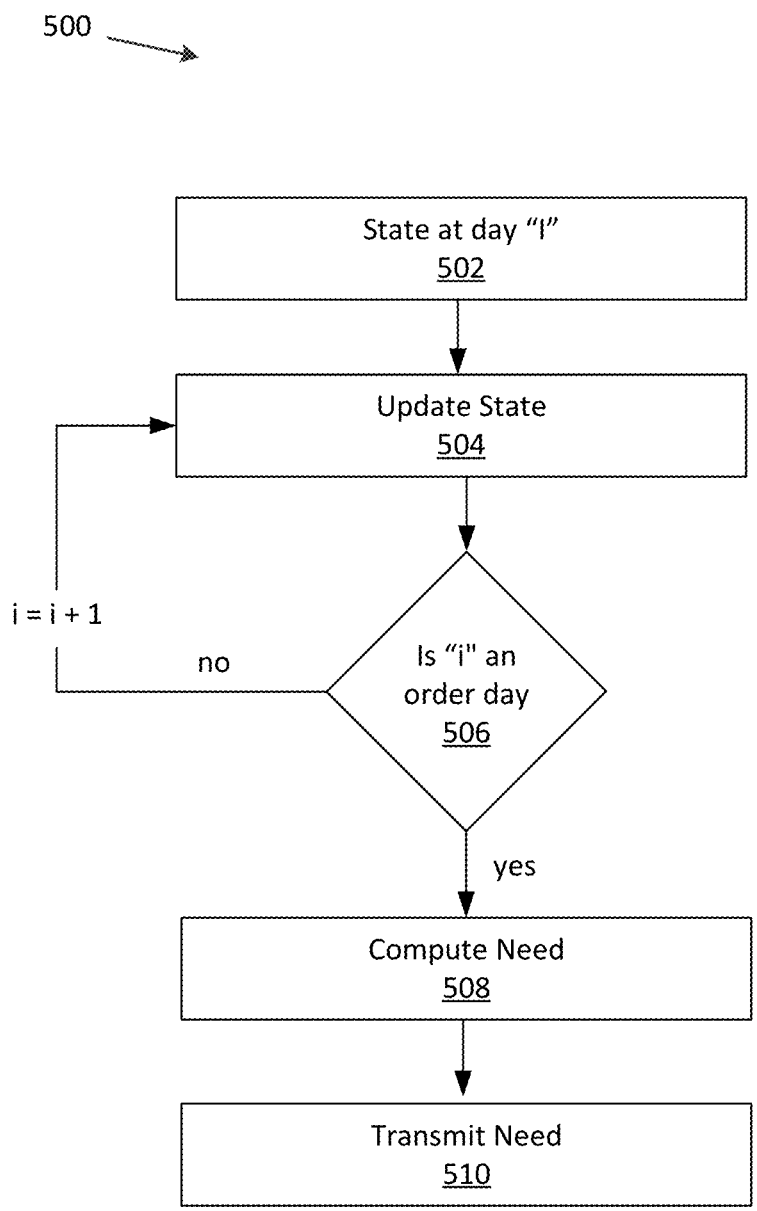
FIG. 5 illustrates an example method for computing the unconstrained inventory need.

FIG. 5 illustrates an example method 500 for computing the unconstrained inventory need. The method 500 is used to compare the ideal inventory position with the expected inventory position and use the difference between them to determine the need. The need can be rounded up by item ordering unit of measure.

At step 502, the state at day one (otherwise referred to as day "i") is determined. Determining the state at day one includes determining the inventory on hand when the inventory on order is received by the inventory and transportation management system 202.

At step 504, the state is updated. The state may be updated if a schedule inventory is received, so inventory levels have changed, or if a requested inventory has been withdrawn, and the inventory levels are lower than expected.

At step 506, it is determined whether or not day "i" is an order day. If day "i" is not an order day, then the method 500 returns to step 504. Step 504 is repeated for the current day. In this example, the first time step 506 occurs is day "i", so the second time step 506 occurs is day "i+1."

If at step 506, day "i" is an order day, then the method 500 moves to step 508. At step 508, the need is computed. Computing the need includes determining the difference between the ideal inventory position and the current inventory position.

At step 510, the need as determined is communicated to the appropriate downstream entities. A downstream entity may be a vendor or supplier. Alternatively, a downstream entity may be another node within the enterprise system, such as when inventory needs to move from one node to a different node.

After the unconstrained inventory need is determined, the inventory is assigned to at least one transportation vessel. During the assignment of inventory to a transportation vessel, it is ensured that the maximum constraints are not violated for any transportation vessel, while also assuring that the minimum number of total transportation vessels are used (the "truck assignment problem" or "the vessel assignment problem" described below).

Solving the vessel assignment problem can be solved using equations 12-15 shown below. First, the vessel assignment problem assumes there are "n" inventory items and "m" constraint types.

$$q_{ij} \forall i \leq n, j \leq m \quad \text{Equation (12)}$$

Equation 12 shows the relationship between the required quantities of each item "i" specified in the units of the constraint type "j." "$min_j$" is the minimum constraints in terms of the units of the constraint type, and "$max_j$" is the maximum constraints in terms of the units of the constraint type.

Each item "i" is assigned to a transportation vessel as shown in equations 13-14, subject to the constraints shown in equation 15.

$$assign_i = k \text{ s.t.} \quad \text{Equation (13)}$$

$$min\ (len((assign_i))) \quad \text{Equation (14)}$$

$$min_j \leq \sum_{i \in \{assign_i = k\}} q_{i,j} \leq max_j \forall j, k \quad \text{Equation (15)}$$

Equation 15 is solved by expressing it as a vector bin packing problem and using the first fit decreasing algorithm with weighted Euclidean norm used for computing item size.

Figure 6:
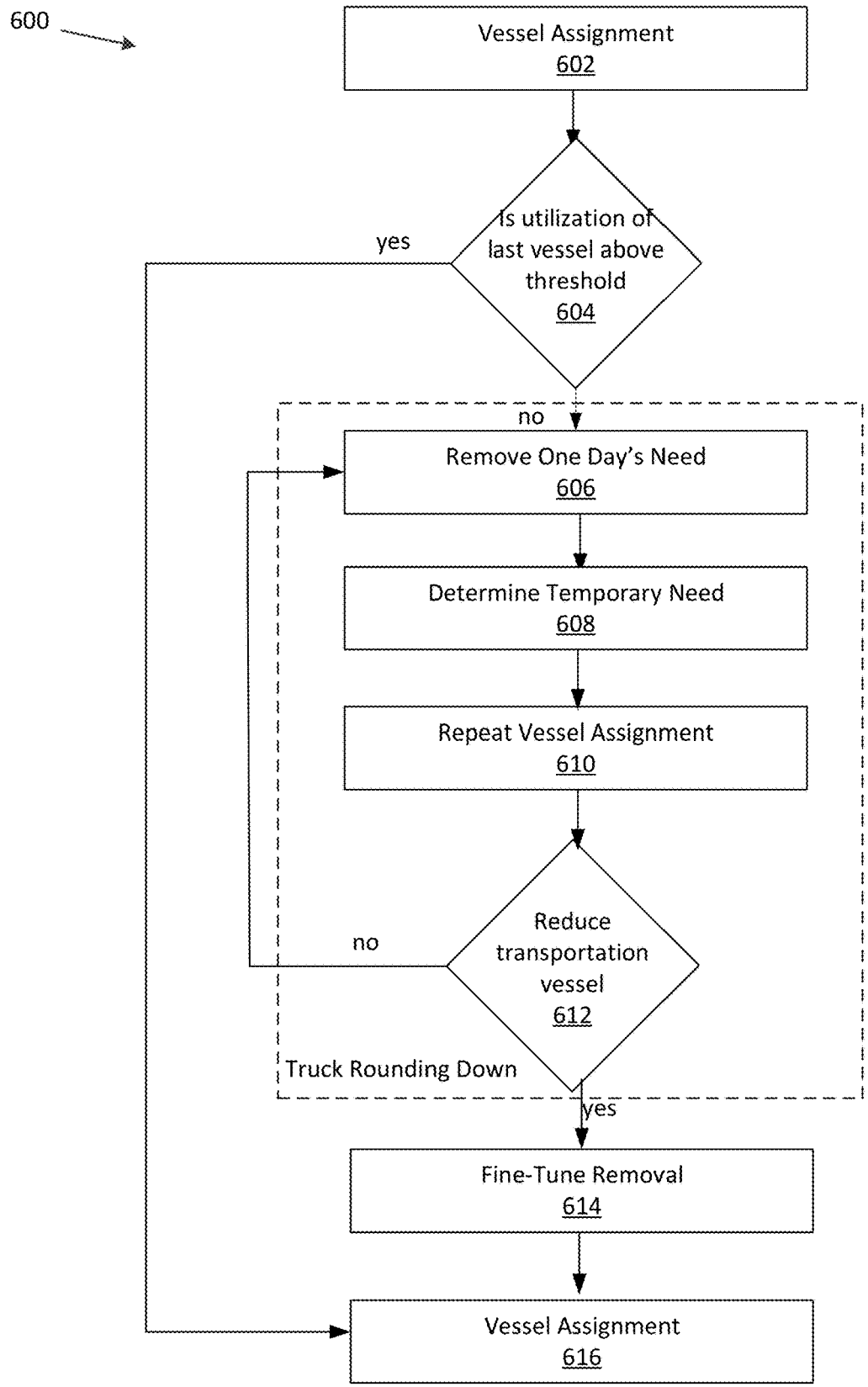
FIG. 6 illustrates an example method of assigning the transportation vehicles.

FIG. 6 illustrates an example method 600 of assigning the transportation vessels. The method 600 is useful to determine whether or not the last transportation vessel filled with the inventory meets the criteria for rounding down based on the rounding rules. If rounding down is needed, inventory ordered is reduced for each item in proportion to the need for the item. This is repeated until one less transportation vessel is needed. The method 600 starts with removing the need of inventory for one days' need for all inventory items. After that, inventory items are removed based on need for one hour at a time for the last day.

The method 600 includes checking whether or not the last transportation vessel filled meets criteria for rounding down based on the rounding rules. If the number of transportation vessels needs to be rounded down, reducing the amount of planned order quantity for each item is computed in proportion to the need for the item and this is repeated until the inventory amount needed is reduced by one truckload (or vesselload).

At step 602, the transportation vessel assignment is received. At step 604, it is determined whether or not the utilization of the last transportation vessel is above a predetermined threshold. If the utilization of the last transportation vessel is above a predetermined threshold, the method 600 moves to step 618.

If the utilization of the last transportation vessel is below a predetermined threshold, then the method 600 moves to step 606. At steps 606-616, the method 600 utilizes a rounding down algorithm. At step 606, one days' need of inventory items is removed. The inventory need is computed for each inventory item for each day, and the total inventory needed for a predetermined future time period is reduced by one days' worth of needed inventory. This creates a temporary need, at step 608.

At step 610, the vessel assignment algorithm is recalculated utilizing the temporary need determined from step 608. Then, at step 612, the method 600 determines if a transportation vessel has been able to be removed from the need. If not, the method 600 moves back to step 606. Steps 606 through 610 are repeated as needed.

Once the transportation vessel need has been reduced by one transportation vessel, the method 600 moves to step 614. Step 614 includes a fine-tuned removal process. The last removed inventory need is broken down into an hourly need. The rounding down procedure can be repeated with an hourly need of inventory.

Finally, at step 618, the transportation vessel assignment is provided to the necessary entity.

Figure 7:
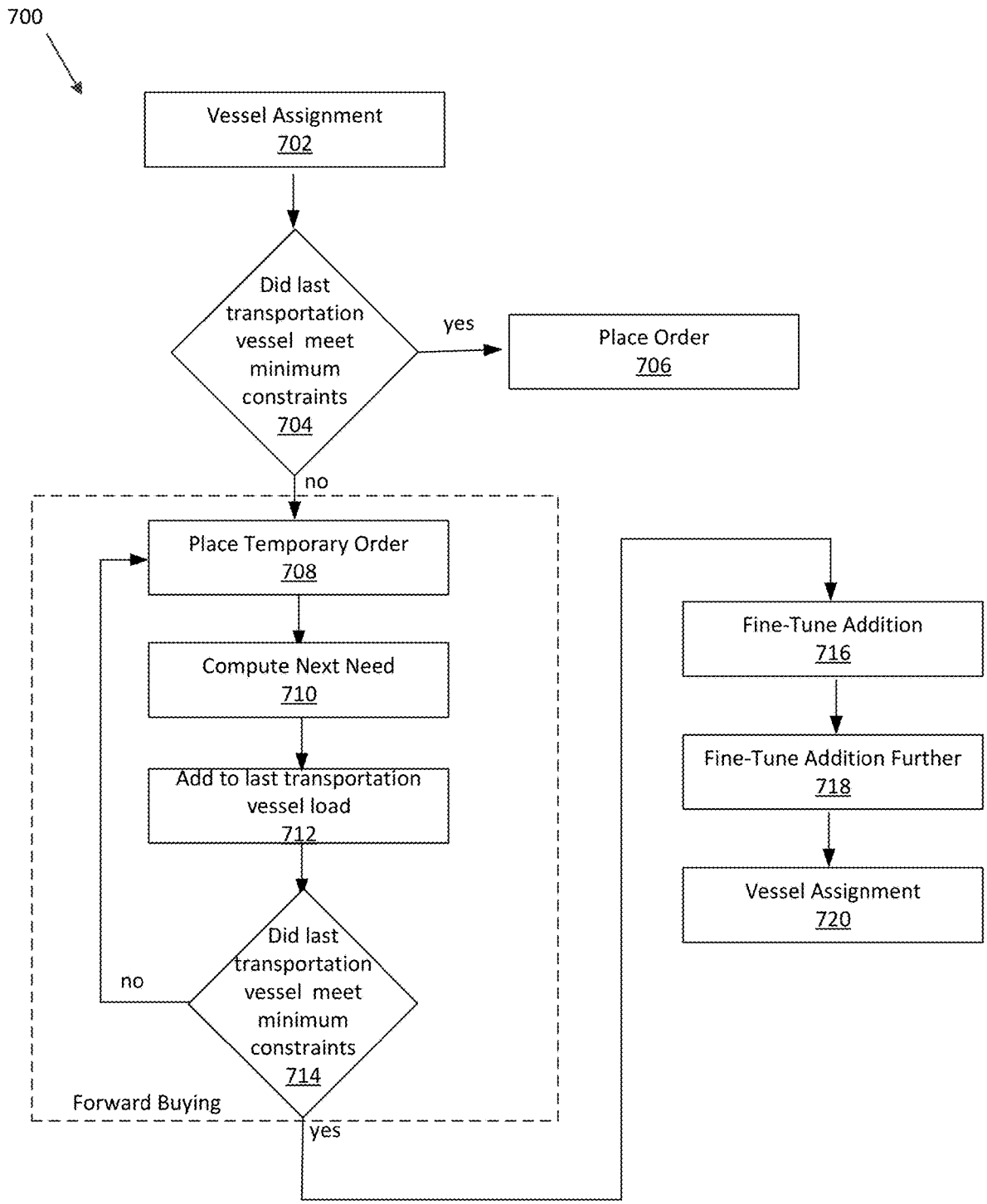
FIG. 7 illustrates an example method of meeting the minimum constraints.

FIG. 7 illustrates an example method 700 of meeting the minimum constraints. The method 700 is useful to obtain the minimum constraints for each of the constraint types, which is added to the residual capacity for each of the transportation vessels except for the last transportation vessel. The sum becomes the minimum order quantity which is used to fulfill for at least one of the constraint types.

Minimum constraints are obtained for each of the constraint types and then is added to the residual capacity for each of the transportation vessels with the exception of the last transportation vessel. The sum becomes the minimum order quantity which is desired to fulfill for at least one of the constraint types. The required quantity "i" is predicted for the next order day for each item after assuming that an order is placed for the currently computed order quantities. If adding to the currently computed quantities does not meet the minimum order constraints, more inventory is added. The process is repeated until minimum order quantities are met.

The required quantity is predicted for the next order day for each inventory item after assuming that an order has been placed for the currently computed order quantities. If adding those to the currently computed quantities does not meet the minimum order quantity, more inventory is added, and this is repeated as needed. If it does satisfy, then it is checked to see if its days' demand has been added. Once the minimum order quantity has been reached, the method 700 determines if any sets of items can be removed while continuing to meet the minimum order quantity. The selection of the set is made using a knapsack algorithm.

At step 702, the vessel assignment is received. At step 704, it is determined whether or not the last transportation vessel meets the minimum constraints. If the last transportation vessel meets the minimum constraints, then the method 700 moves to step 706.

At step 706, the order is placed. Transportation vessel assignments are obtained for day one and the order is placed according to the transportation vessel assignments.

If the last transportation vessel does not meet the minimum constraints, the method 700 moves to step 708. Steps 708-714 are referred to as a forward buying portion of the method 700. At step 708, a temporary order is placed. The order is placed for the current need as per the most recently received transportation vessel assignment.

Next, at step 710, the next inventory need is computed. A temporary update is stated as per the algorithm to get the next inventory need.

At step 712, the next need is added to the transportation vessel. The last need is the theoretical need calculated at the previous step.

At step 714, it is determined whether or not the last transportation vessel meets the minimum constraints. If it does not, then the method 700 moves back to step 708 and the forward buying portion of the method 700 is repeated.

If the last transportation vessel meets the minimum constraints, then the method 700 moves to step 716. At step 716, fine-tune addition is determined. This includes removing the last added need with the repeat forward buying at the daily need. This is where fine-tuning is repeated with an hourly need. So, for example, instead of adding inventory need on a per day basis, inventory need is added on a per hour basis.

At step 718, the fine-tune addition process is further completed. Removing items from the last added need occurs as much as possible while still meeting the satisfied minimum constraints. The item set to be removed is computed using the knapsack algorithm.

Finally, at step 720, the transportation vessel assignment is provided to the necessary entity.

Figure 8:
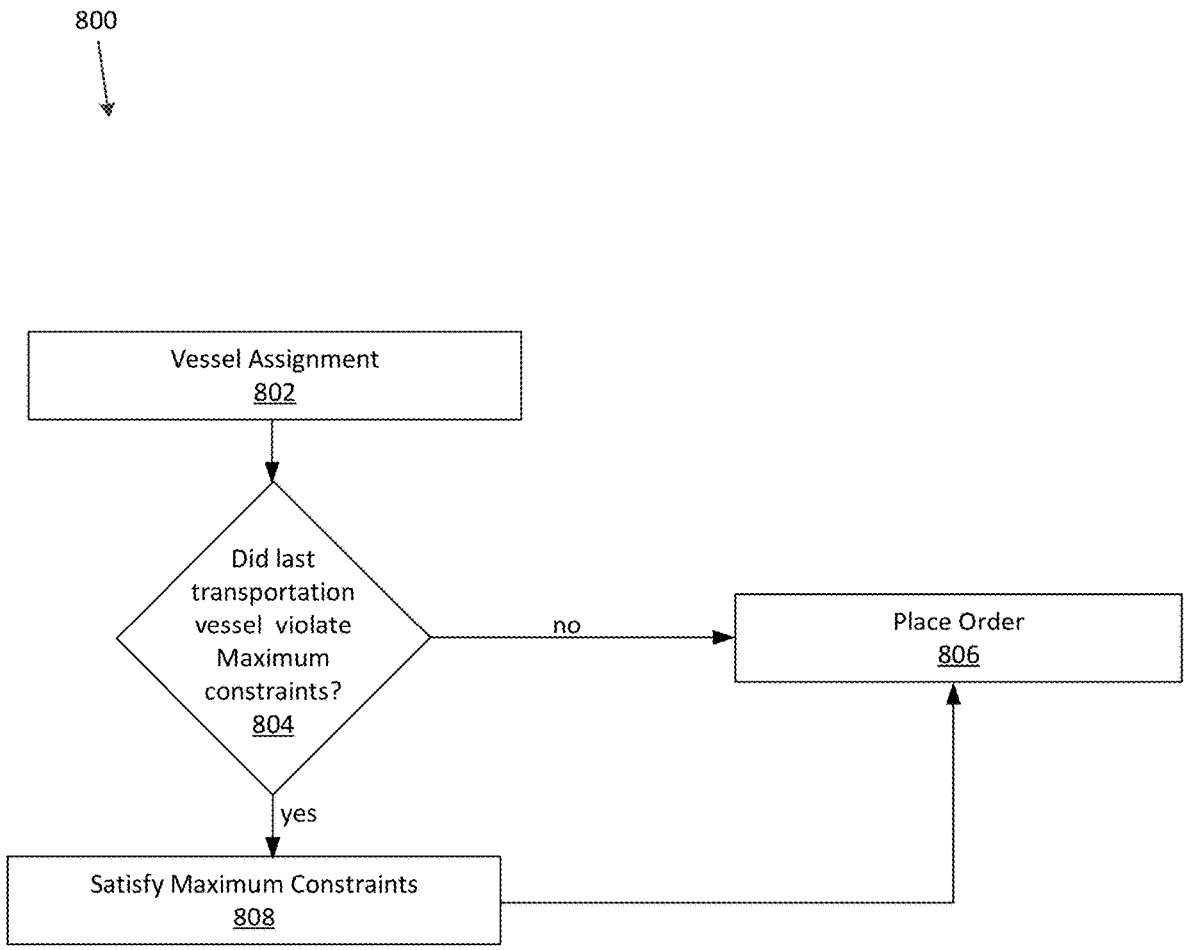
FIG. 8 illustrates an example method of checking the feasibility of transportation vehicle assignment.

FIG. 8 illustrates an example method 800 of checking the feasibility of transportation vessel assignment. The method 800 ensures that none of the maximum constraints are violated. The equation 16 is solved subject to the constraints of equation 17.

$$\min \left( \sum q_i x_i \right) \quad \text{Equation (16)}$$

$$q_{ij} x_i \geq \left( \sum_i q_{ij} - \max_j \right)^\dagger \forall j \quad \text{Equation (17)}$$

In the equations 16-17, "q" is the quantity added to the last iteration up to meet the minimum constraints in the method 600. The binary variable is "$x_i$" and is "TRUE" if the quantity "$q_i$" should be removed for the item "i." If any of the "$x_i$" values are "TRUE" then the minimum constraints is not met. However, the minimum constraints is a softer constraint compared to the maximum constraints since the loop minimum constraints is a physical limitation. Method 800 solves this problem.

At step 802, the transportation vessel assignments are received. At step 804, it is determined if the last transportation vessel violated any of the maximum constraints. If none of the maximum constraints are violated, the method 800 moves to step 806.

If the maximum constraints are violated, then the method 800 moves to step 808. At step 808, maximum constraints are satisfied. Satisfying the maximum constraints includes removing from the last added need as little as needed to satisfy all the constraints.

The method 800 moves to step 806 when none of the maximum constraints are violated. At step 806, the order is placed. Transportation vessel assignments can also be obtained for day "i" in the orders placed according to the fixed truck assignments.

Figure 9:
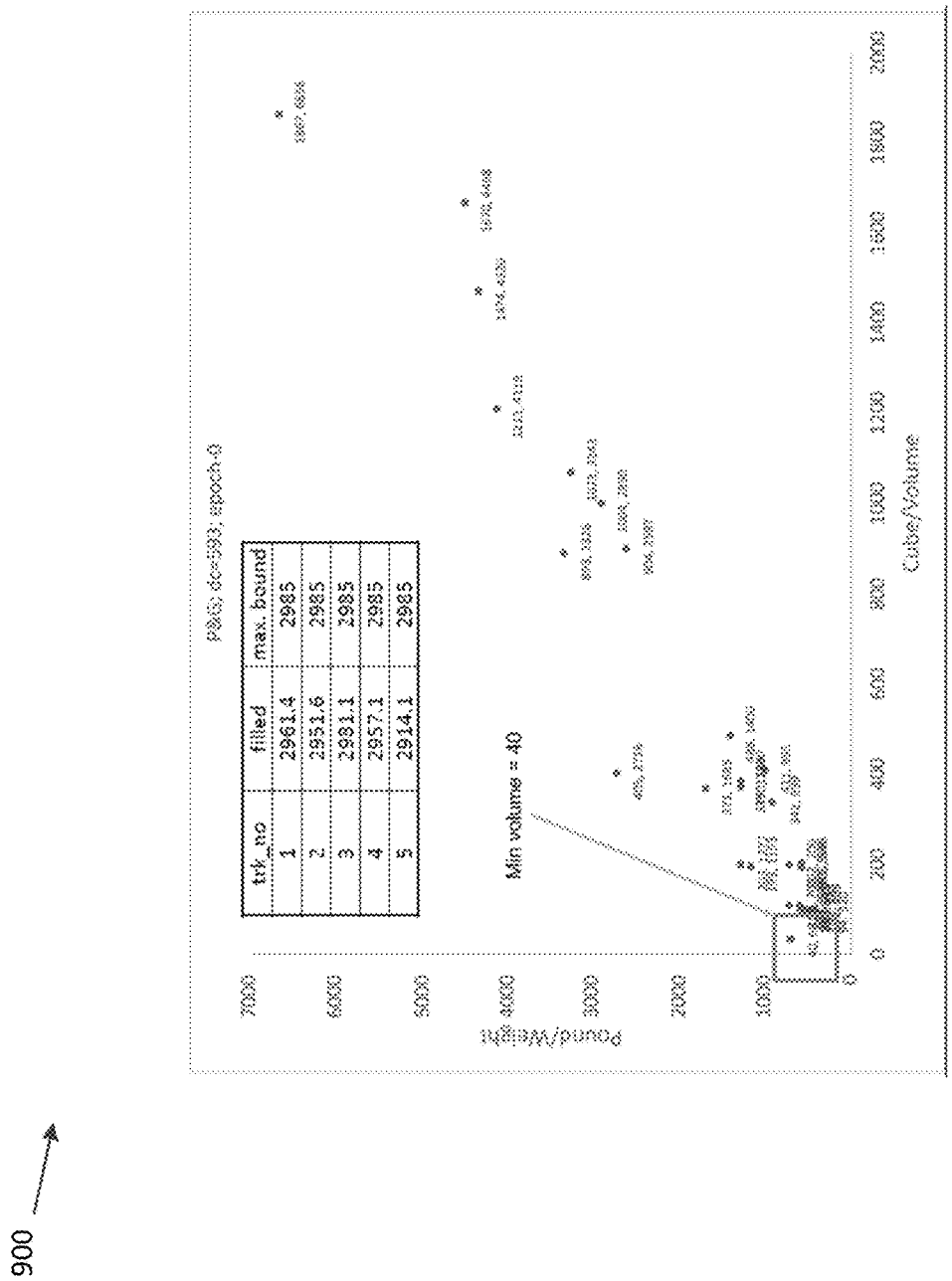
FIG. 9 illustrates an example graph of transportation vessel loading.

FIG. 9 illustrates an example graph 900 of transportation vessel loading. The graph 900 plots the constraint of weight against the constraint of volume, in a context in which the transportation vessel is a truck of a predetermined size (i.e., a maximum constrain capacity). Each data point represents the transportation vessel with the maximum constraint capacity. Since each inventory item or plurality of inventory items can fit within a transportation vessel in a variety of configurations, the capacity of each transportation vessel is different.

The invention and load optimization system is capable of determining the packing of a transportation vessel with inventory items of different sizes, shapes, and weights, to maximize the capacity usage of each transportation vessel.

Figure 10:
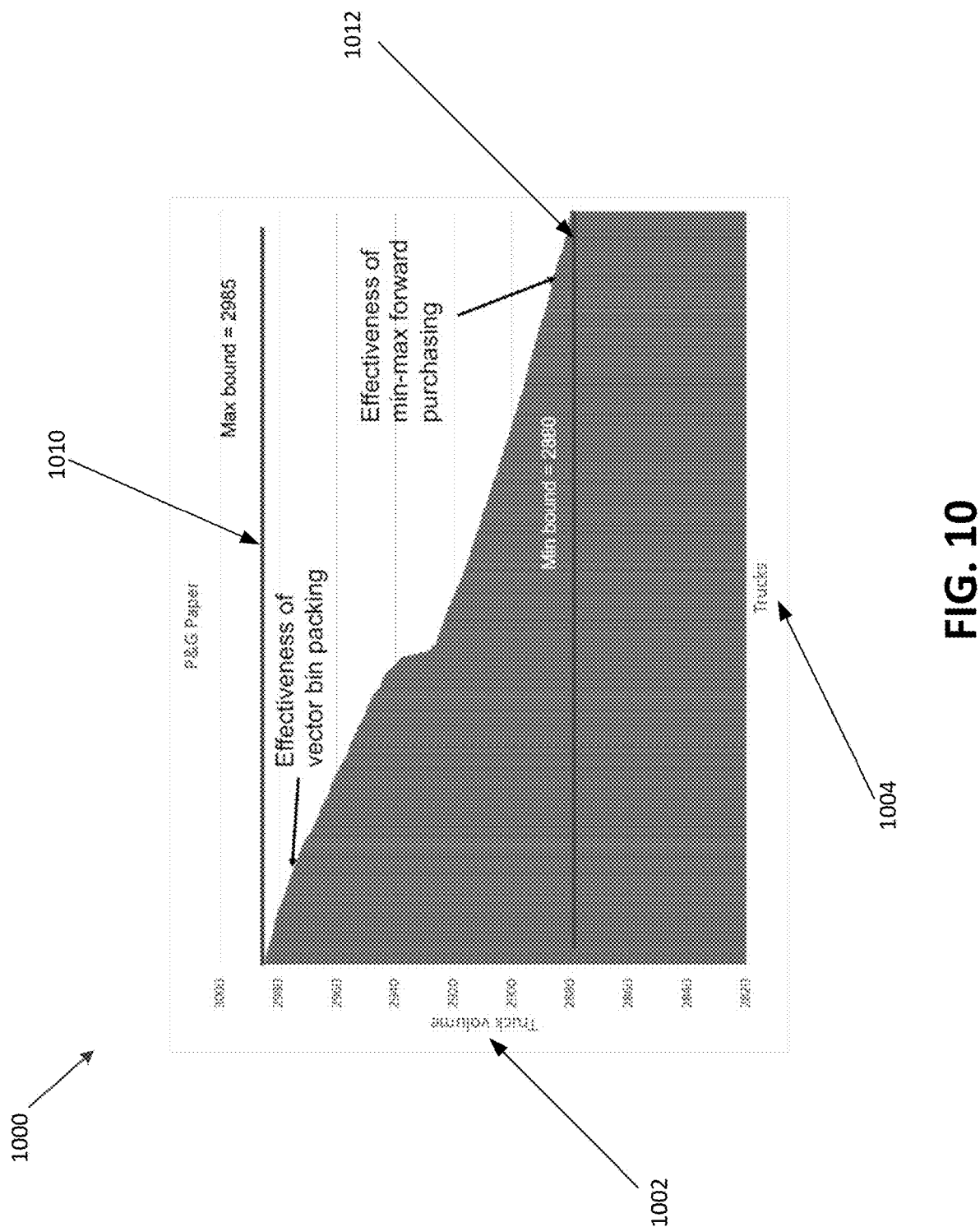
FIG. 10 illustrates an example output that demonstrates the effectiveness of vector bin packing.

FIG. 10 illustrates an example output 1000 that demonstrates the effectiveness of vector bin packing and the effectiveness of minimum/maximum forward purchasing in the truckload context. As shown, a truck volume 1002 is listed on the y-axis and a number of trucks 1004 is listed on the x-axis. The example output 1000 shown is for the inventory item "paper."

The output 1000 includes the maximum constraint line 1010 and the minimum constraint line 1012. In the example shown, the maximum constraint line 1010 is located at a truck volume of 2985. However, as noted, maximum constraint may be weights or a combination of weight and volume. The minimum constraint line 1012 is located at 2880 units of volume.

Figure 11:
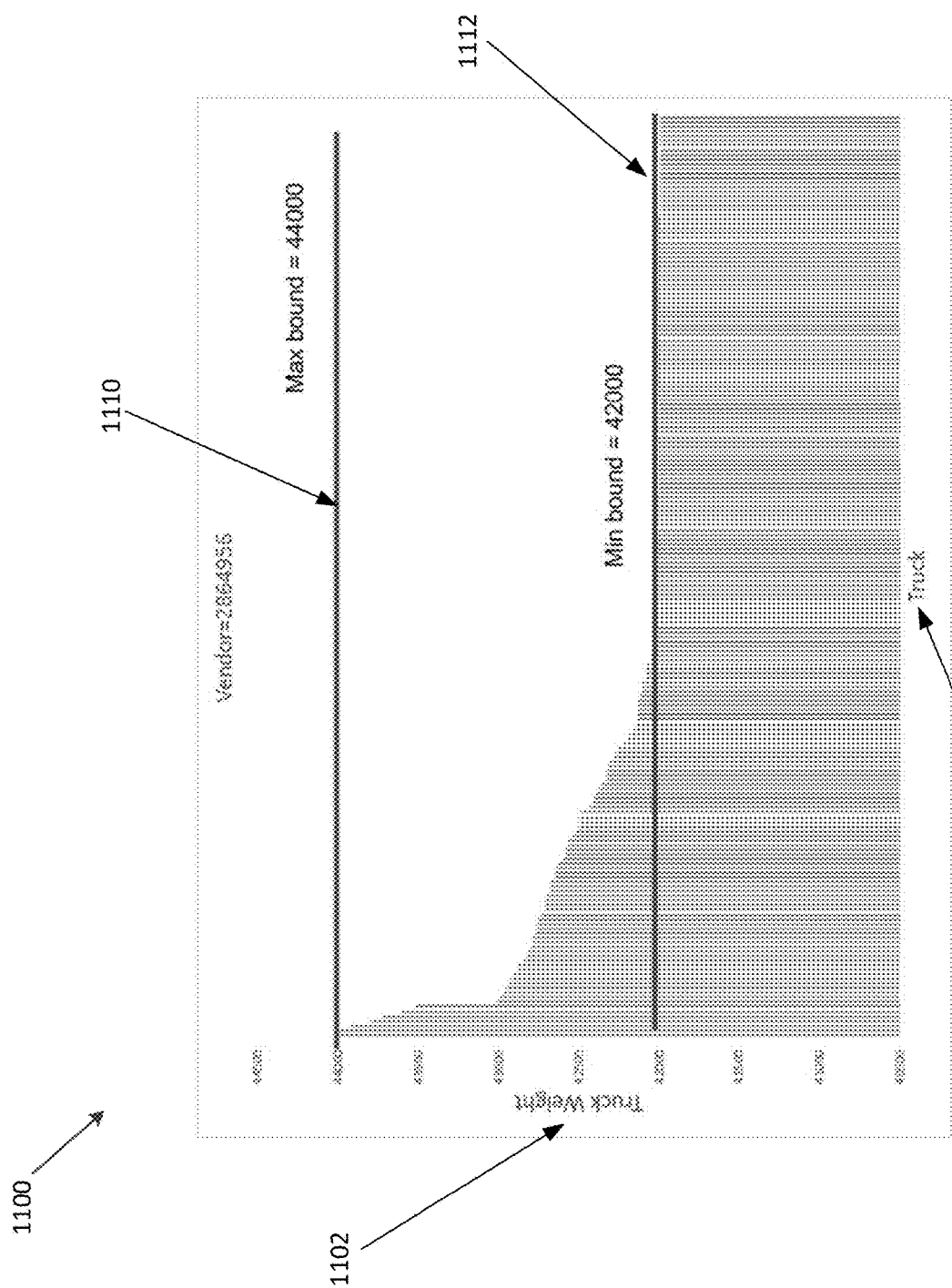
FIG. 11 illustrates another example output that demonstrates the effectiveness of vector bin packing.

FIG. 11 illustrates another example output 1100 that demonstrates the effectiveness of vector bin packing when the constraint is based on weight of the transportation vessel. The truck weight 1102 is listed on the y-axis and the number of trucks 1104 is listed on the x-axis.

The output 1100 includes a maximum constraint line 1110 and a minimum constraint line 1112. In the example shown, the maximum constraint line 1110 is at a weight of 44,000 pounds. The minimum constraint line 1112 is at a weight of 4200 pounds. As shown, each of the trucks listed on the x-axis all have a common minimum weight.

Figure 12:
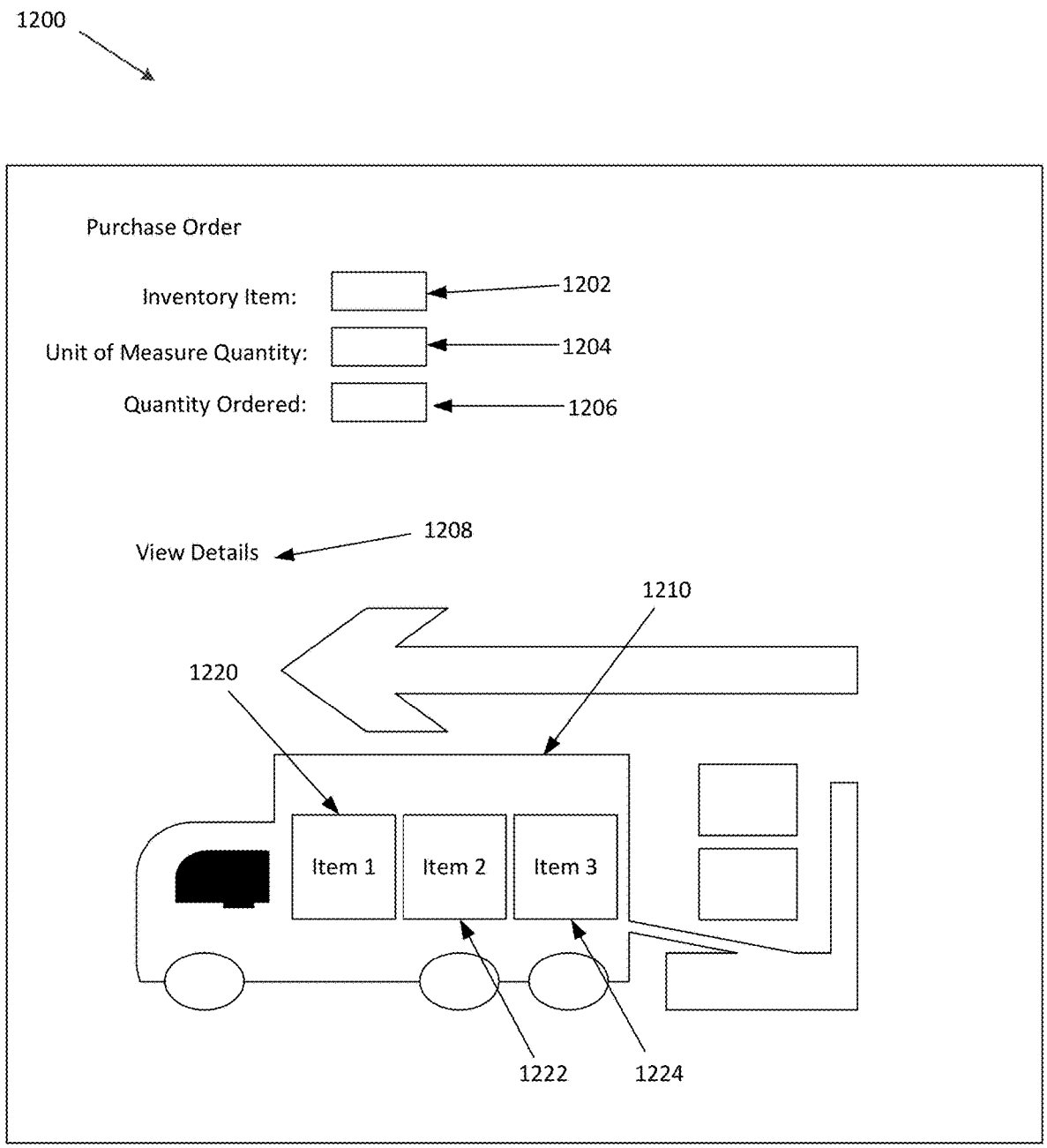
FIG. 12 illustrates an example user interface of the inventory and transportation management system.

FIG. 12 illustrates an example user interface 1200 provided to an administrative user of the inventory and load optimization system 202. The user interface 1200 includes a purchase order summary, such as the inventory item 1202, the unit of measure quantity 1204, and the quantity ordered 1206. The user interface 1200 can also include a detailed view 1208 of the transportation vessel packing.

The detailed view 1208 includes a view of the transportation vessel 1210 including a first inventory item 1220, a second inventory item 1222, and a third inventory item 1224, including, optionally, a manner or arrangement of items within the transportation vessel 1210.

Figure 13:
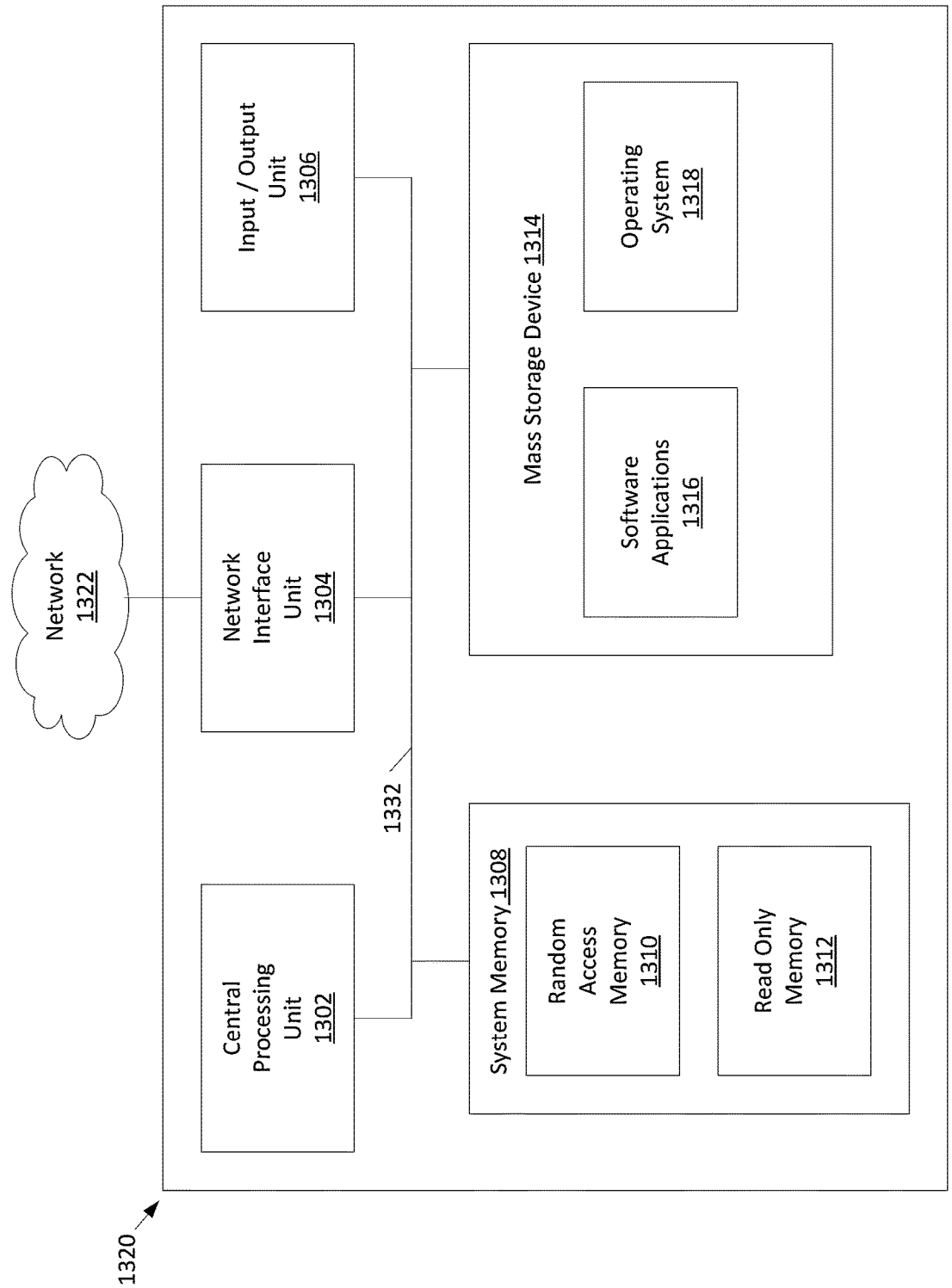
FIG. 13 illustrates an example block diagram of a computing system.

Referring now to FIG. 13, an example block diagram of a computing system 1320 is shown that is useable to implement aspects of the inventory and load optimization system 202 of FIG. 2. In the embodiment shown, the computing system 1320 includes at least one central processing unit ("CPU") 1302, a system memory 1308, and a system bus 1332 that couples the system memory 1308 to the CPU 1302. The system memory 1308 includes a random access memory ("RAM") 1310 and a read-only memory ("ROM") 1312. A basic input/output system that contains the basic routines that help to transfer information between elements within the computing system 1320, such as during startup, is stored in the ROM 1312. The computing system 1320 further includes a mass storage device 1314. The mass storage device 1314 is able to store software instructions and data.

The mass storage device 1314 is connected to the CPU 1302 through a mass storage controller (not shown) connected to the system bus 1332. The mass storage device 1314 and its associated computer-readable storage media provide non-volatile, non-transitory data storage for the computing system 1320. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 1302 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 1320.

According to various embodiments of the invention, the computing system 1320 may operate in a networked environment using logical connections to remote network devices through a network 1322, such as a wireless network, the Internet, or another type of network. The computing system 1320 may connect to the network 1322 through a network interface unit 1304 connected to the system bus 1332. It should be appreciated that the network interface unit 1304 may also be utilized to connect to other types of networks and remote computing systems. The computing system 1320 also includes an input/output controller 1306 for receiving and processing input from a number of other devices, including a touch user interface display screen, or another type of input device. Similarly, the input/output controller 1306 may provide output to a touch user interface display screen or other type of output device.

As mentioned briefly above, the mass storage device 1314 and the RAM 1310 of the computing system 1320 can store software instructions and data. The software instructions include an operating system 1318 suitable for controlling the operation of the computing system 1320. The mass storage device 1314 and/or the RAM 1310 also store software instructions, that when executed by the CPU 1302, cause the computing system 1320 to provide the functionality discussed in this document. For example, the mass storage device 1314 and/or the RAM 1310 can store software instructions that, when executed by the CPU 1302, cause the computing system 1320 to receive and analyze inventory and demand data.

In accordance with the present disclosure, and in particular with respect to the computing device disclosed in FIG. 13, it is noted that in some instances, rather than direct execution of software instructions on computing hardware, a virtualization system may be implemented that is configured to host and execute software instructions within a virtualized environment. In such instances, a portion of an enterprise-wide pool of computing systems may be allocated for execution of software instructions on an as-needed basis, e.g., for scaling to accommodate execution of simulations as discussed above for purposes of inventory and transportation vessel optimization. Additionally, such simulations may be performed concurrently on separately-allocated virtual machines to assist with parallelization of the process described above.

Referring to FIGS. 1-13 generally, it is noted that the systems and methods described herein have a number of advantages over existing approaches for transportation planning. For example, assuming a total number of transportation vessels and an associated set of constraints on those vessels (e.g., minimum and maximum weights and volumes), an efficient solution may be obtained for allocation of transportation vessels to particular delivery routes at particular times to optimize use of such transportation vessels. Additionally, where particular items may be needed in the future, the optimization in packing individual transportation vessels can incorporate a forward buying algorithm which uses otherwise unallocated capacity of transportation vessels (e.g., unused capacity of a semi-trailer) to fulfill demand in advance of a day on which items would be needed. As seen in particular in FIGS. 10-11, in the context of semi trailers, the methods and systems described herein ensure high utilization, ensure that the maximum constraints are met, and ensure that, during a majority of instances, minimum constraints are also met.

The description and illustration of one or more embodiments provided in this application are not intended to limit or restrict the scope of the invention as claimed in any way. The embodiments, examples, and details provided in this application are considered sufficient to convey possession and enable others to make and use the best mode of the claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A method of managing inventory and transportation vessels within an enterprise system, the method comprising:
receiving, at a software tool implemented on an inventory and transportation management computing system comprising at least one processor, inputs related to current inventory levels for at least one inventory item selected from a plurality of inventory items, and an optimal inventory balance for the at least one inventory item for a location, the location selected from a plurality of retail locations, a receiving center, and a flow center;

receiving, at the software tool, inputs related to a capacity of at least one transportation vessel selected from a plurality of transportation vessels;
determining, by a capacity analyzer of the inventory and transportation management computing system, individually for each transportation vessel, a capacity constraint, the capacity constraint comprising a minimum amount of the at least one inventory item and a maximum amount of the at least one inventory item that can be transported on the transportation vessel;
dynamically determining, by an inventory needs analyzer of the inventory and transportation management computing system, an inventory need for a predetermined initial future time period for each of the at least one inventory items, the inventory need being the difference between the current inventory level and the optimal inventory balance, wherein the capacity analyzer and the inventory needs analyzer are executed at least partially in parallel by the at least one processor;
automatically generating an inventory request by:
  determining an inventory amount to be ordered for the at least one item based on the inventory need;
  determining a number of transportation vessels of the at least one transportation vessel needed to transfer the inventory item to the location;
  assigning the at least one inventory item to the at least one transportation vessel, wherein assigning the at least one inventory item to the at least on transportation vessel includes determining whether utilization of the at least one transportation vessel is within the capacity constraint and rounding up or rounding down the inventory amount to be ordered for the at least one item until the utilization of the at least one transportation vessel is within the constraint, and wherein rounding up or rounding down the inventory amount to be ordered for the at least one item is initially based on inventory need determined at a first predetermined periodic basis and fine-tuned with an inventory need determined at a second predetermined periodic basis having greater granularity than the first predetermined periodic basis;
  determining packing instructions for the at least one transportation vessel that maximizes the utilization of the at least one transportation vessel; and
  generating the inventory request including the rounded up or rounded down order amount for the at least one inventory items and the packing instructions for the at least one transportation vessel;
automatically communicating the inventory request, wherein the inventory request includes a purchase order including the rounded up or rounded down order amount for the at least one inventory item to order and a packing instruction for the transportation vessel; and
generating and providing a user interface including the order read request and a diagram depicting the packing instructions for the at least one transportation vessel.

2. The method of claim 1, wherein when the inventory need is greater than the capacity constraint, generating the inventory request further comprises rationing the order amount for the at least one inventory item.

3. The method of claim 1, wherein when the inventory need is greater than the capacity constraint, generating the inventory request further comprises:
  decreasing the order amount for the at least one inventory item proportional to the inventory need for the at least one inventory item.

4. The method of claim 1, wherein when the inventory need is less than the capacity constraint, generating the inventory request further comprises:
  dynamically determining the inventory need for a predetermined second future time period, wherein the second future time period is a time period further in the future than the initial future time period; and
  increasing the order amount for the at least one inventory item based at least in part on the inventory need for the predetermined second future time period, wherein the increased order amount is within the capacity constraint of the transportation vessel.

5. The method of claim 1, wherein generating the order amount within the capacity constraint comprises:
  dynamically determining the inventory need for a predetermined second future time period, wherein the second future time period is a time period further in the future than the initial future time period; and
  determining, based on the inventory need for the second future time period, whether the purchase order should be placed or whether the purchase order should be canceled.

6. The method of claim 5, wherein when the purchase order is canceled, a subsequent purchase order includes the order amount from the canceled purchase order.

7. The method of claim 1, wherein the capacity constraint is selected from volume, weight, or a combination of volume and weight.

8. The method of claim 1, wherein determining the capacity constraint further comprises determining a minimum order quantity for the at least one inventory item, the minimum order quantity required by a vendor.

9. A system for managing inventory and transportation vessels within an enterprise system, the system comprising:
  a computing system including a data store, a processor, and a memory communicatively coupled to the processor, the memory storing instructions executable by the processor to:
    receive inputs related to current inventory levels for at least one inventory item selected from a plurality of inventory items, and an optimal inventory balance for the at least one inventory item for a location, the location selected from a plurality of retail locations, a receiving center, and a flow center;
    receive inputs related to a capacity of at least one transportation vessel selected from a plurality of transportation vessels;
    determine, by a capacity analyzer, individually for each transportation vessel, a capacity constraint, the capacity constraint comprising a minimum amount of the at least one inventory item and a maximum amount of the at least one inventory item that can be transported on the transportation vessel;
    dynamically determine, by an inventory needs analyzer, an inventory need for a predetermined initial future time period for each of the at least one inventory items, the inventory need being the difference between the current inventory level and the optimal inventory balance, wherein the capacity analyzer and the inventory needs analyzer are executed at least partially in parallel by the processor;
    automatically generate an inventory request, wherein to generate the inventory read requests includes to:
      determine an inventory amount to be ordered for the at least one item based on the inventory need;

determine a number of transportation vessels of the at least one transportation vessel needed to transfer the inventory item to the location;

assign the at least on inventory item to the at least one transportation vessel, wherein to assign the at least one inventory item to the at least one transportation vessel includes to determine whether utilization of the at least one transportation vessel is within the capacity constraint and rounding up or rounding down the inventory amount to be ordered for the at least one item until the utilization of the at least one transportation vessel is within the constraint, and wherein rounding up or rounding down the inventory amount to be ordered for the at least one item is initially based on inventory need determined at a first predetermined periodic basis and fine-tuned with an inventory need determined at a second predetermined periodic basis having greater granularity than the first predetermined periodic basis;

determine packing instructions for the at least one transportation vessel that maximizes the utilization of the at least one transportation vessel; and generate the inventory request including the rounded up or rounded down order amount for the at least one inventory items and the packing instructions for the at least one transportation vessel;

automatically communicate the inventory request, wherein the inventory request includes a purchase order including the rounded up or rounded down order amount for the at least one inventory item to order and a packing instruction for the transportation vessel; and generating and providing a user interface including the order read request and a diagram depicting the packing instructions for the at least one transportation vessel.

10. The system of claim 9, wherein the optimal inventory balance is based on stochastic inputs based at least in part on historical sales data of the at least one inventory item for at least one of the nodes.

11. The system of claim 9, wherein the optimized routes are further based on stochastic inputs that are received from a stochastic database, the stochastic inputs based at least in part on the historical transportation vessel usage, historical transit times, and backhaul times.

12. The system of claim 9, wherein the user interface is further configured to provide a selectable view of each of the transportation vessels required for the purchase order wherein a diagram of packing instruction for a transportation vessel is displayed when selected.

13. The system of claim 9, wherein the capacity constraint is selected from volume, weight, or a combination of volume and weight.

14. The system of claim 9, wherein determining the capacity constraint further comprises determining a minimum order quantity for the at least one inventory item, the minimum order quantity required by a vendor.

15. The system of claim 9, wherein when the inventory need is greater than the capacity constraint, the computing system is configured to ration the order amount for the at least one inventory item.

16. The system of claim 9, wherein when the inventory need is greater than the capacity constraint, the computing system is configured to:

decrease the order amount for the at least one inventory item proportional to the inventory need for the at least one inventory item.

17. The system of claim 9, wherein when the inventory need is less than the capacity constraint, the computing system is configured to:

determine the inventory need for a predetermined second future time period, wherein the second future time period is a time period further in the future than the initial future time period; and increase the order amount for the at least one inventory item based at least in part on the inventory need for the predetermined second future time period, wherein the increased order amount is within the capacity constraint of the transportation vessel.

18. A non-transitory computer-readable medium comprising computer-executable instructions which, which executed by a computing system cause the computing system to perform a method of managing inventory items in a supply chain, the method comprising:

receiving inputs related to current inventory levels for at least one inventory item selected from a plurality of inventory items, and an optimal inventory balance for the at least one inventory item for a location, the location selected from a plurality of retail locations, a receiving center, and a flow center;

receiving inputs related to a capacity of at least one transportation vessel selected from a plurality of transportation vessels;

determining, by a capacity analyzer, individually for each transportation vessel, a capacity constraint, the capacity constraint comprising a minimum amount of the at least one inventory item and a maximum amount of the at least one inventory item that can be transported on the transportation vessel;

dynamically determining, by an inventory needs analyzer, an inventory need for a predetermined initial future time period for each of the at least one inventory items, the inventory need being the difference between the current inventory level and the optimal inventory balance wherein the capacity analyzer and the inventory needs analyzer are executed at least partially in parallel by the computing system;

automatically generating an inventory request by:

determining an inventory amount to be ordered for the at least one item based on the inventory need;

determining a number of transportation vessels of the at least one transportation vessel needed to transfer the inventory item to the location;

assigning the at least one inventory item to the at least one transportation vessel, wherein assigning the at least one inventory item to the at least on transportation vessel includes determining whether utilization of the at least one transportation vessel is within the capacity constraint and rounding up or rounding down the inventory amount to be ordered for the at least one item until the utilization of the at least one transportation vessel is within the constraint, and wherein rounding up or rounding down the inventory amount to be ordered for the at least one item is initially based on inventory need determined at a first predetermined periodic basis and fine-tuned with an inventory need determined at a second predetermined periodic basis having greater granularity than the first predetermined periodic basis;

determining packing instructions for the at least one transportation vessel that maximizes the utilization of the at least one transportation vessel; and generating the inventory request including the rounded up or rounded down order amount for the at least one inventory items and packing instructions for the at least one transportation vessel;

wherein when the inventory need is greater than the capacity constraint, the computing system is configured to ration the order amount for the at least one inventory item; and wherein when the inventory need is less than the capacity constraint, the computing system is configured to increase the order amount for the at least one inventory item, wherein the increased order amount is within the capacity constraint of the transportation vessel; and automatically communicating the inventory request, wherein the inventory request includes a purchase order including the rounded up or rounded down order amount for the at least one inventory item to order and a packing instruction for the transportation vessel; and generating and providing a user interface including the order read request and a diagram depicting the packing instructions for the at least one transportation vessel.

* * * * *